United States Patent [19]
Podola et al.

[11] Patent Number: 5,286,787
[45] Date of Patent: Feb. 15, 1994

[54] MOISTURE-CURING POLYURETHANE SEALING COMPOUNDS HAVING IMPROVED PROPERTIES

[75] Inventors: Tore Podola, Monheim; Martin Majolo, Erkelenz, both of Fed. Rep. of Germany

[73] Assignee: Henkel Kommanditgesellschaft auf Aktien, Duesseldorf, Fed. Rep. of Germany

[21] Appl. No.: 866,173
[22] PCT Filed: Dec. 17, 1990
[86] PCT No.: PCT/EP90/02212
§ 371 Date: Jun. 26, 1992
§ 102(e) Date: Jun. 26, 1992
[87] PCT Pub. No.: WO91/09893
PCT Pub. Date: Jul. 11, 1991

[30] Foreign Application Priority Data
Dec. 27, 1989 [DE] Fed. Rep. of Germany ....... 3943090

[51] Int. Cl.$^5$ ............................................. C08G 18/61
[52] U.S. Cl. .................................... 524/773; 524/775; 524/776; 524/792; 524/850; 525/126; 525/127; 525/129; 528/28
[58] Field of Search ............... 524/773, 775, 776, 792, 524/850; 525/126, 127, 129; 528/28

[56] References Cited
FOREIGN PATENT DOCUMENTS
3629237 3/1988 Fed. Rep. of Germany .

Primary Examiner—Maurice J. Welsh
Attorney, Agent, or Firm—Ernest G. Szoke; Wayne C. Jaeschke; Real J. Grandmaision

[57] ABSTRACT

Moisture-curing jointing and sealing compounds containing polyurethane prepolymers are made more stable to weathering conditions by addition thereto of a reactive polysiloxane containing one or more functional groups which react with the polyurethane propolymers.

24 Claims, No Drawings

MOISTURE-CURING POLYURETHANE SEALING COMPOUNDS HAVING IMPROVED PROPERTIES

BACKGROUND OF THE INVENTION

1. Field of the Invention

This invention relates to moisture-curing jointing compounds based on NCO-terminated polyurethane prepolymers. More particularly, the invention relates to moisture-curing jointing compounds having improved properties through the addition of reactive polysiloxanes.

2. Discussion of Related Art

Moisture-curing polyurethane-based sealing compounds are well known to the expert, for example from DE 37 26 547. They consist essentially of isocyanate-terminated polyurethane prepolymers and swollen polymers present therein as thixotropic agent or filler. In addition, plasticizers, swelling aids, pigments, dyes, stabilizers, catalysts and other auxiliaries are mentioned as further constituents in DE 37 26 547. Although known polyurethane jointing compounds largely meet the stringent demands made of them, some aspects are still in need of improvement. This applies in particular to weathering resistance. A key factor in this regard is UV stability. A key criterion for determining the long-term stability of weathered jointing compounds, apart from visual evaluation, are the elongation at break values which the present invention seeks to improve. Improvements are also desirable in regard to the processing properties, such as stringing and smoothability.

It is known to the expert, for example from DE-OS 32 21 655, that UV absorbers, such as benzophenone or trioxazole derivatives, can be added to sealing compounds to improve their UV stability. These absorbers provide increased, but not permanent, UV stability. It is known to the expert that jointing compounds based on polysiloxanes normally show higher UV stability than comparable polyurethane sealing compounds. However, commercially available polysiloxane sealing compounds generally have undesirable properties for certain applications, including for example poor spreadability, "greasiness" and odor emission during processing. Mixtures of the two components can only be produced with considerable effort, if at all, and are entirely unsatisfactory in regard to storability, in other words the systems in question have a pronounced tendency to separate. Attempts to counteract this tendency by additives, such as dispersion aids and/or emulsifiers, result in unwanted deteriorations in other performance of the jointing compounds.

The use of reactive polysiloxanes in polyurethane sealing compounds to improve their weathering stability has not hitherto been known to the expert. Although compounds of siloxanes and urethanes are known in principle, these compounds differ from the present invention in their molecular structure and/or are used in a different technological field. Thus, EP 250 248 describes block copolymers of polysiloxanes and urethane segments which are produced from diaminopolysiloxanes and diisocyanates and which are used as pressure-sensitive (contact) adhesives. According to European patent application 293 084, reactive polysiloxanes are present in polyurethane gloss paints to improve their anti-friction properties.

The problem addressed by the present invention was to provide moisture-curing polyurethane jointing compounds which would show improved long-term stability under weathering conditions and, in particular, to UV radiation. In addition, the moisture-curing polyurethane jointing compounds according to the invention would show distinctly improved processing properties, such as stringing and smoothability.

DESCRIPTION OF THE INVENTION

Other than in the operating examples, or where otherwise indicated, all numbers expressing quantities of ingredients or reaction conditions used herein are to be understood and modified in all instances by the term "about".

According to the invention, this problem has been solved by moisture-curing jointing compounds based on NCO-terminated polyurethane prepolymers which, if desired, contain fillers, plasticizers and/or other additives, characterized in that they contain reactive polysiloxanes to improve their long-term stability under weathering conditions.

The moisture-curing jointing compounds according to the invention contain polyurethane prepolymers bearing on average two or more isocyanate groups per molecule. These polyurethane prepolymers are prepared by mixing alcohols having a functionality of 2 or more with an excess of isocyanate groups having a functionality of 2 or more. The properties of the products can be influenced through the choice of the quantities used.

Suitable polyol components are both low molecular weight and high molecular weight compounds. Low molecular weight compounds which may be used as polyol components for polyurethane prepolymers are, for example, ethylene glycol, propylene glycol, neopentyl glycol, butane-1,4-diol, hexane-1,6-diol and triols, such as glycerol, trimethylol propane or trimethylol ethane, and higher hydroxy compounds, such as pentaerythritol.

Polyether polyols and/or polyester polyols are generally used as the relatively high molecular weight polyol component. Polyether polyols may be prepared by reaction of an epoxide or tetrahydrofuran with a low molecular weight polyol component. The epoxide may be, for example, ethylene oxide, propylene oxide, butylene oxide, styrene oxide, cyclohexene oxide, trichlorobutylene oxide and epichlorohydrin, while the polyol may be, for example, a compound such as ethylene, diethylene or propylene glycol.

Polyesters as starting materials for polyurethane prepolymers are normally prepared by reaction of hydroxyl compounds with carboxylic acids. The low molecular weight polyfunctional hydroxyl components already mentioned may be used as the hydroxyl compounds. The acid component may be a compound such as adipic acid, phthalic acid, oxalic acid, maleic acid, succinic acid, glutaric acid, azelaic acid, sebacic acid and also a tricarboxylic acid. Suitable polyesters for the production of polyurethane prepolymers can also be obtained by ring-opening polymerization of, for example, ε-caprolactone or methyl-ε-caprolactone. In addition to polyesters and polyethers, however, natural materials, so-called oleochemical polyols or castor oil, for example, may be used as the polyol component.

According to the invention, preferred polyols are polyether polyols, more particularly polyether polyols of the type obtainable by reaction of glycerol, propylene oxide adducts and polypropylene glycol.

Both aromatic and aliphatic and/or cycloaliphatic isocyanates may be used as the isocyanate component. Suitable isocyanates having a functionality of 2 or more are, for example, the isomers of tolylene diisocyanate, isophorone diisocyanate, dicyclohexyl methane diisocyanate, tetramethylene diisocyanate, trimethyl hexamethylene diisocyanate, trimethyl xylene diisocyanate, hexamethylene diisocyanate and diphenyl methane diisocyanate or even triisocyanates, such as 4,4',4''-triphenyl methane triisocyanate for example. According to the invention, aromatic diisocyanates, more particularly technical diphenyl methane-4,4'-diisocyanate (MDI) and tolylene-2,4-diisocyanate (TDI), are preferred.

In one preferred embodiment, the polyurethane prepolymers are prepared by reaction of a glycerol/propylene oxide adduct and/or a polypropylene glycol with technical diphenyl methane diisocyanate and/or technical tolylene diisocyanate. The isocyanate is preferably used in excess, so that the polyurethane prepolymer formed contains reactive NCO groups.

The stability of jointing compounds is generally achieved by addition of fine-particle solids, also known as fillers. In general, fillers largely ensure that the sealing compound has the necessary internal cohesion after application to prevent it from running or bulging from vertical joints. The above-mentioned additives or fillers may be divided into pigments and thixotropicizing fillers, also known in short as thixotropicizing agents. In the case of jointing compounds based on polyurethane prepolymers, these thixotropic agents have to meet additional requirements. For example, there should be no unwanted reactions with the isocyanate groups. Accordingly, the thixotropic agent may be selected essentially from swellable polymer powders. Examples of suitable polymer powders are polyacrylonitrile, polyurethane, polyvinyl chloride, polyacrylates, polyvinyl alcohols, polyvinyl acetates and the corresponding copolymers. Particularly good results can be obtained with fine-particle polyvinyl chloride powder.

The properties of the polyurethane jointing compounds may be further improved by addition of further components to the polymer powder used as thixotropic agent. These further components are substances which come into the category of the plasticizers or rather swelling agents and swelling aids used for plastics. It is necessary in this regard to determine the optimal composition of the prepolymer/polymer powder/plasticizer/swelling aid systems. For example, the plasticizers and swelling aids should not react with isocyanate groups of the prepolymer. Accordingly, plasticizers from the class of phthalic acid esters may be used where polyvinyl chloride powder, for example, is added as the thixotropic agent. Examples of suitable compounds from this class are dioctyl phthalate, dibutyl phthalate and benzyl butyl phthalate. Other classes of compounds which have the required properties are chloroparaffins, alkyl sulfonic acid esters, for example of phenols or cresols, and fatty acid esters. Plasticizers based on alkyl sulfonic acid esters and polyvinyl chloride as swellable polymer powder are particularly suitable for the purposes of the invention.

To improve their long-term stability to weathering influences, the jointing compounds according to the invention contain reactive polysiloxanes. Reactive polysiloxanes are polysiloxanes which, in the chain or side chain, contain at least one group reactive to isocyanate-terminated constituents of the sealing compounds and/or the compounds formed therefrom by moisture curing. Polysiloxanes such as these are, for example, epoxy-modified polysiloxanes, polyhydrogen alkyl siloxanes and/or silanol-modified polysiloxanes. Epoxymodified siloxanes are understood by the expert to be chemically reactive silicone oils containing modified epoxyalkyl side groups. In addition, polymethyl hydrogen siloxane may be present as a reactive polysiloxane. Silanol-modified siloxanes are alkyl siloxane polymers which contain at least one terminal silanol group. These so-called silanol oils may be regarded as reactive analogs of typical silicone oils. The jointing compounds according to the invention preferably contain hydroxy-terminated polydimethyl siloxane.

Although the exact cause of the improvement in longterm stability to weathering influences, particularly UV radiation, of the jointing compounds according to the invention has not yet been fully elucidated, it is nevertheless a fact that the improvement is considerable. This applies both to the visual evaluation of the surface of weathered jointing compounds according to the invention by comparison with known polyurethane jointing compounds and also to the elongation values, more particularly elongation at break. The jointing compounds according to the invention show considerably better stringing and smoothability during processing than conventional polyurethane jointing compounds. The jointing compounds according to the invention also have a smoother feel, as can readily be determined by touching. The jointing compounds according to the invention also show a distinct reduction in the surface tack typical of polyurethane jointing compounds after skin formation during hardening, as can also be determined by touching.

It may be assumed that the improved properties mentioned are attributable inter alia to the fact that two basically immiscible or poorly immiscible and/or non-permanently miscible liquids are attached to one another by chemical bonds, so that they are unable to separate. At the same time, however, the optical impression is that of a two-phase system which can be illustrated by the fact that, when basically clear polyurethane prepolymers are mixed with basically clear reactive siloxanes, the mixture becomes opaque or cloudy or has the appearance of a finely disperse emulsion. The reactive polysiloxanes, of which the reactive groups are preferably terminal, can react during mixing with the polyisocyanate groups and/or the groups of the polyurethane prepolymers formed therefrom by moisture curing, so that any separation is permanently suppressed.

In one preferred embodiment, the reactive polysiloxanes contain only one reactive group which is capable of reacting with the reactive group of a polyurethane prepolymer so that, after the reaction, the polysiloxanes form the termination of a polyurethane macromolecule. The jointing compounds according to the invention show particularly favorable processing properties in this case.

The processing properties of the jointing compounds according to the invention and their long-term stability are also favorably affected by viscosities of the reactive polysiloxanes at 23° C. in the range from 25 to 500 Pas and preferably in the range from 50 to 400 Pas.

The ratio between the quantity of reactive polysiloxanes and the quantity of polyurethane prepolymers is also an important factor for optimizing and improving the above-mentioned properties of the jointing compounds. Quantities of 1 to 30% by weight and, more particularly, 5 to 20% by weight reactive polysiloxanes, based on the quantity of polyurethane prepolymers are preferred. Quantities of less than 1% by weight reactive siloxanes do not produce any significant improvement in the weathering stability of the jointing compounds. Although jointing compounds containing more than 30% by weight reactive siloxanes can be processed as such, they undergo unwanted and distinct deteriorations in their performance properties. For example, their elastic properties, particularly their resilience, can deteriorate to the point where, after weathering, shrinkage cracks appear in the surface. In addition, a high percentage content of polysiloxanes generally leads to a readily soilable surface of "greasy" feel and to a reduction in elongation at break.

A moisture-curing jointing compound which solves the problem addressed by the invention consists of 20 to 40% by weight polyurethane prepolymer, 20 to 40% by weight swellable polymer powder, 15 to 35% by weight plasticizer or swelling agent, 1 to 10% by weight swelling aid, 0.2 to 12% by weight reactive siloxanes, 1 to 10% by weight pigments and dyes, 1 to 10% by weight stabilizers and, if desired, 0.01 to 10% by weight catalyst and other auxiliaries.

Suitable swelling aids are low molecular weight organic substances which are miscible with the polymer powder and the plasticizer, but do not react with the isocyanate groups of the polyurethane prepolymer. Examples of swelling aids such as these can be found in the relevant specialist handbooks on polymers and plastics. Preferred swelling aids for polyvinyl chloride powders are esters, ketones, aliphatic hydrocarbons, aromatic hydrocarbons and also aromatic hydrocarbons containing alkyl substituents. The last-mentioned swelling aids, particularly xylene, are used as preferred swelling aids for polyvinyl chlorides in accordance with the present invention.

Pigments and dyes used in the jointing compounds according to the invention may be any of the known substances normally used for this purpose, such as titanium dioxide, iron oxides and carbon black. It is known that the stability of jointing compounds in storage can be improved by the addition of stabilizers, such as benzoyl chloride, acetyl chloride, toluenesulfonic acid methyl ester, carbodiimides and/or polycarbodiimides. Olefins containing 8 to 20 carbon atoms have proved to be particularly good stabilizers. Besides their stabilizing effect, these stabilizers can also perform the function of plasticizers and swelling agents. It is preferred to use olefins containing 8 to 18 carbon atoms, particularly when the double bond is in the 1,2-position. The best results are obtained when the molecular structure of these stabilizers is linear.

In addition, the jointing compounds also contain catalysts, such as dibutyl tin dilaurate, dibutyl tin diacetate and/or tin(II) octoate, in catalytic quantities in order to accelerate the reaction. In the context of the present invention, other auxiliaries are, for example, curing agents, drying agents and coupling agents.

The mixture of polyurethane prepolymer, polymer powder, plasticizer, swelling aids, pigments and dyes, reactive polysiloxanes, stabilizers and also catalysts and other auxiliaries used in the jointing compound according to the invention has to be formulated to meet the particular requirements which the jointing compound is intended to satisfy. According to the invention, preferred jointing compounds contain 25 to 35% by weight polyurethane prepolymers, 25 to 35% by weight swellable polymer powder, 20 to 30% by weight plasticizer or swelling agent, 3 to 7% by weight swelling aids, 4 to 9% by weight pigments and dyes, 1 to 5% by weight stabilizers and 1 to 10% by weight reactive polysiloxanes and, if desired, 0.01 to 2% by weight catalysts and other auxiliaries.

The invention is illustrated by the following Examples.

EXAMPLES

The polyurethane used in all the following Examples was prepared from
62 parts by weight polypropylene glycol
24 parts by weight polyether polyol and
15 parts by weight technical diphenyl methane-4,4'-diisocyanate (MDI).

Dihydroxy polydimethyl siloxane having a viscosity of 350 Pas was used as the reactive siloxane. The jointing compounds were prepared as follows:

A paste of alkylsulfonic acid ester, chloroparaffin, PVC powder and pigments was heated to 70° C. After cooling to 40° C., the prepolymer and the other constituents were added with stirring, followed by degassing at 30 mbar.

| Constituents | Examples (No.) | | | | | |
| --- | --- | --- | --- | --- | --- | --- |
| | 1 | 2 | 3 | 4 | 5 | 6 |
| PU prepolymer | 29 | 29 | 29 | 29 | 29 | 29 |
| Reactive polysiloxanes | 0 | 0.5 | 1.0 | 2.0 | 4.0 | 6.0 |
| Alkylsulfonic acid ester | 18.3 | 18.1 | 17.95 | 17.6 | 17.0 | 16.3 |
| Chloroparaffin | 7.9 | 7.8 | 7.75 | 7.6 | 7.3 | 7.1 |
| PVC powder | 31.3 | 31.1 | 30.8 | 30.3 | 29.2 | 28.1 |
| TiO$_2$ | 5 | 5 | 5 | 5 | 5 | 5 |
| Other pigments and additives | 8.5 | 8.5 | 8.5 | 8.5 | 8.5 | 8.5 |

Examples 1 and 2 are Comparison Examples.

Testing of processing properties

In the sensory tests, a distinct improvement in processing properties, such as stringing and smoothability, was observed for all the Examples according to the invention. In addition, the surface tack after skin formation typical of one-component polyurethane jointing compounds was distinctly reduced.

Testing of long-term stability under weathering conditions

In special molds, approx. 3 mm thick plates were drawn from the jointing compound and, after crosslinking, test specimens having the following dimensions were punched out from the plates:

| | |
| --- | --- |
| Overall length | approx. 80 mm |
| Head width | 20 mm |
| Web length | 50 mm |
| Web width | 10 mm |
| Thickness | 1.0–4.0 mm |
| Measuring length | 40 mm |

The tensile strengths, elongations at bread and moduli were measured in accordance with DIN 53 504 (1975 Edition) and ISO/R37.

| | |
| --- | --- |
| Feed rate | 150 m/min. |
| Test atmosphere | Standard conditioning atmosphere, 23° C./50% relative air |

-continued

| Tensile testing machine | humidity Universal testing machine |
|---|---|

This machine corresponds to the general guidelines for materials testing machines according to DIN 51 220 and, in regard to the applied load indication, to class 1 of DIN 51 221.

The test specimens were exposed to light in a SUNTEST CPS (flooding with water, no filtering).

Cycle:
Flooding time 10 mins.
Exposure time 180 mins.
Number of cycles 150

Exposed samples after 150 cycles

| No. | Tensile strength N/mm$^2$ | Elongation at break % | Moduli (N/mm$^2$) at 100% elongation | at 600% elongation |
|---|---|---|---|---|
| 1 | 0.98 | 1156 | 0.40 | 0.68 |
| 2 | 0.75 | 1138 | 0.38 | 0.66 |
| 3 | 0.90 | 1144 | 0.36 | 0.65 |
| 4 | 1.05 | 1257 | 0.37 | 0.66 |
| 5 | 1.01 | 1328 | 0.32 | 0.57 |
| 6 | 1.00 | 1372 | 0.31 | 0.60 |

It can be seen from the Table that, in the Examples according to the invention, elongation at break increases distinctly with increasing reactive polysiloxane content whereas the moduli at 100% and 600% elongation show a distinct reduction in this series.

The elongations at break, moduli and tensile strengths of the unexposed test specimens according to Examples 1 to 6 show hardly differences from one another.

In addition, the exposed test specimens are visually evaluated on the principle of school marks. The test specimens were evaluated for surface quality. They show different degrees of crack formation ("elephant skin") in accordance with the following marks:

| No. | Mark |
|---|---|
| 1 | 5.0 |
| 2 | 4.5 |
| 3 | 3.0 |
| 4 | 2.5 |
| 5 | 2.0 |
| 6 | 2.0 |

We claim:
1. A moisture-curing jointing and sealing compound composition having improved stability against weather conditions, said composition comprising an NCO-terminated polyurethane prepolymer containing on average 2 or more isocyanate groups in the molecule, and a reactive polysiloxane containing one or more functional groups which react with said polyurethane prepolymer or the compound formed therefrom as a result of moisture curing said composition,

2. A composition as in claim 1 wherein said reactive polysiloxane is present in an amount of from about 1 to about 30% by weight, based on the weight of said polyurethane prepolymer.

3. A composition as in claim 1 wherein said reactive polysiloxane is selected from the group consisting of an epoxy-modified polysiloxane, a polyhydrogen alkyl siloxane, and a silanol modified polysiloxane.

4. A composition as in claim 1 wherein said reactive polysiloxane has a viscosity at about 23° C. of from about 25 to about 500 Pas.

5. A composition as in claim 1 comprising;
(a) from about 20 to about 40%/wt of said polyurethane prepolymer,
(b) from about 20 to about 40%/wt of a swellable polymer powder,
(c) from about 15 to about 35%/wt of a plasticizer,
(d) from about 1 to about 10%/wt of a swelling aid,
(e) from about 0.2 to about 12%/wt of said reactive polysiloxane,
(f) from about 1 to about 10%/wt of a pigment or dye,
(g) from about 1 to about 10%/wt of a stabilizer, and optionally,
(h) from about 0.01 to about 10%/wt of a catalyst for said polyurethane prepolymer.

6. A composition as in claim 1 comprising;
(a) from about 25 to about 35%/wt of said polyurethane prepolymer,
(b) from about 25 to about 35%/wt of a swellable polymer powder,
(c) from about 20 to about 30%/wt of a plasticizer,
(d) from about 3 to about 7%/wt of a swelling aid,
(e) from about 1 to about 10%/wt of said reactive polysiloxane,
(f) from about 4 to about 9%/wt of a pigment or dye,
(g) from about 1 to about 5%/wt of a stabilizer, and optionally,
(h) from about 0.01 to about 2%/wt of a catalyst for said polyurethane prepolymer.

7. A composition as in claim 1 wherein said polyurethane prepolymer comprises a reaction product of a polyether polyol with an excess of a diisocyanate.

8. A composition as in claim 1 containing polyvinyl chloride as a swellable polymer powder.

9. A composition as in claim 1 containing a plasticizer selected from the group consisting of a phthalic acid ester, an alkylsulfonic acid ester, and a chloroparaffin.

10. A composition as in claim 1 containing a swelling aid selected from the group consisting of an ester, a ketone, an aliphatic hydrocarbon, and an aromatic hydrocarbon.

11. A composition as in claim 1 containing a stabilizer selected from the group consisting of benzoyl chloride, acetyl chloride, toluenesulfonic acid methyl ester, a carbodiimide, a polycarbodiimide, and an olefin containing 8 to 20 carbon atoms.

12. The process of improving the long-term stability against weather conditions of a moisture-curing jointing and sealing compound based on an NCO-terminated polyurethane prepolymer containing on average 2 or more isocyanate groups in the molecule, comprising adding to said compound a reactive polysiloxane containing one or more functional groups which react with said polyurethane prepolymer or the compound formed therefrom as a result of moisture curing said compound.

13. A process as in claim 12 wherein said reactive polysiloxane is added in an amount of from about 1 to about 30% by weight, based on the weight of said polyurethane prepolymer.

14. A process as in claim 12, wherein said reactive polysiloxane is selected from the group consisting of an epoxy-modified polysiloxane, a polyhydrogen alkyl siloxane, and a silanol-modified polysiloxane.

15. A process as in claim 12 wherein said reactive polysiloxane has a viscosity at about 23° C. of from about 25 to about 500 Pas.

16. A process as in claim 12 wherein said compound contains:
(a) from about 20 to about 40%/wt of said polyurethane prepolymer,
(b) from about 20 to about 40%/wt of a swellable polymer powder,
(c) from about 15 to about 35%/wt of a plasticizer,
(d) from about 1 to about 10%/wt of a swelling aid,
(e) from about 0.2 to about 12%/wt of said reactive polysiloxane,
(f) from about 1 to about 10%/wt of a pigment or dye,
(g) from about 1 to about 10%/wt of a stabilizer, and optionally,
(h) from about 0.01 to about 10%/wt of a catalyst for said polyurethane prepolymer.

17. A process as in claim 12 wherein said compound contains;
(a) from about 25 to about 35%/wt of said polyurethane prepolymer,
(b) from about 25 to about 35%/wt of a swellable polymer powder,
(c) from about 20 to about 30%/wt of a plasticizer,
(d) from about 3 to about 7%/wt of a swelling aid,
(e) from about 1 to about 10%/wt of said reactive polysiloxane,
(f) from about 4 to about 9%/wt of a pigment or dye,
(g) from about 1 to about 5%/wt of a stabilizer, and optionally,
(h) from about 0.01 to about 2%/wt of a catalyst for said polyurethane prepolymer.

18. A process as in claim 12 wherein said polyurethane prepolymer comprises a reaction product of a polyether polyol with an excess of a diisocyanate.

19. A process as in claim 12 wherein said compound contains polyvinyl chloride as a swellable polymer powder.

20. A process as in claim 12 wherein said compound contains a plasticizer selected from the group consisting of a phthalic acid ester, an alkylsulfonic acid ester, and a chloroparaffin.

21. A process as in claim 12 wherein said compound contains a swelling aid selected from the group consisting of an ester, a ketone, an aliphatic hydrocarbon, and an aromatic hydrocarbon.

22. A process as in claim 12 wherein said compound contains a stabilizer selected from the group consisting of benzoyl chloride, acetyl chloride, toluenesulfonic acid methyl ester, a carbodiimide, a polycarbodiimide, and an olefin containing 8 to 20 carbon atoms.

23. A composition as in claim 1 further containing an additive selected from the group consisting of an isocyanate-inert filler, a plasticizer, a thixotropic agent, a swelling aid, a pigment, and a dye.

24. A process as in claim 12 wherein said compound further contains an additive selected from the group consisting of an isocyanate-inert filler, a plasticizer, a thixotropic agent, a swelling aid, a pigment, and a dye.

* * * * *